United States Patent [19]
Gadberry et al.

[11] Patent Number: 5,979,555
[45] Date of Patent: Nov. 9, 1999

[54] SURFACTANTS FOR HYDRAULIC FRACTORING COMPOSITIONS

[75] Inventors: James F. Gadberry, Danbury, Conn.;
Michael D. Hoey, Maplewood, N.J.;
Ralph Franklin, Danbury, Conn.;
Glenda del Carmen Vale; Foad Mozayeni, both of Bethel, Conn.

[73] Assignee: Akzo Nobel NV, Arnhem, Netherlands

[21] Appl. No.: 08/982,359

[22] Filed: Dec. 2, 1997

[51] Int. Cl.⁶ ..................... E21B 43/26
[52] U.S. Cl. ............ 166/270.1; 166/275; 166/308; 507/240; 507/922
[58] Field of Search ............ 166/270.1, 275, 166/305.1, 308; 507/203, 240, 922

[56] References Cited

U.S. PATENT DOCUMENTS

| | | |
|---|---|---|
| 3,059,909 | 10/1962 | Wise . |
| 3,202,556 | 8/1965 | Chrisp . |
| 3,292,698 | 12/1966 | Savins . |
| 3,301,723 | 1/1967 | Chrisp . |
| 3,888,312 | 6/1975 | Tiner et al. . |
| 3,917,536 | 11/1975 | Crowe . |
| 3,974,077 | 8/1976 | Free . |
| 4,120,356 | 10/1978 | Meister ................... 166/267 |
| 4,432,881 | 2/1984 | Evani . |
| 4,541,935 | 9/1985 | Constien et al. . |
| 4,554,082 | 11/1985 | Holtmyer et al. ............ 166/308 X |
| 5,551,516 | 9/1996 | Norman et al. . |

FOREIGN PATENT DOCUMENTS

| | | |
|---|---|---|
| 1185779 | 4/1985 | Canada . |
| 1443244 | 7/1976 | United Kingdom . |

*Primary Examiner*—Roger Schoeppel
*Attorney, Agent, or Firm*—Dilworth & Barrese

[57] ABSTRACT

Viscoelastic surfactant based aqueous fluid systems are described that are useful in fracturing subterranean formations penetrated by a wellbore. The preferred surfactant compositions contain quaternary ammonium salts wherein the long chain alkyl substituent contains about 3% or less of groups containing 18 or less carbon atoms. The amount of intermediate compounds in the surfactant composition is less than about 1%. The surfactant composition can be used in conjunction with an inorganic water soluble salt such as ammonium chloride or potassium chloride, and an organic stabilizing additive.

20 Claims, No Drawings

SURFACTANTS FOR HYDRAULIC FRACTORING COMPOSITIONS

TECHNICAL FIELD

This disclosure relates generally to the art of fracturing a subterranean formation penetrated by a wellbore. More specifically, novel surfactants useful in formulating aqueous viscoelastic surfactant-based hydraulic fracturing fluids, particularly in formations having high temperature and high permeability are described.

BACKGROUND OF RELATED ART

Hydraulic fracturing is a term that has been applied to a variety of methods used to stimulate the production of fluids such as oil, natural gas, brines, etc., from subterranean formations. In hydraulic fracturing, a fracturing fluid is injected through a wellbore and against the face of the formation at a pressure and flow rate at least sufficient to overcome the overburden pressure and to initiate and/or extend a fracture(s) into the formation. The fracturing fluid usually carries a proppant such as 20–40 mesh sand, bauxite, glass beads, etc., suspended in the fracturing fluid and transported into a fracture. The proppant then keeps the formation from closing back down upon itself when the pressure is released. The proppant-filled fractures provide permeable channels through which the formation fluids can flow to the wellbore and thereafter be withdrawn.

Hydraulic fracturing has been used for many years as a stimulation technique and extensive work has been done to solve problems present at each stage of the process. For example, a fracturing fluid is often exposed to high temperatures and/or high pump rates and shear which can cause the fluids to degrade and to prematurely drop the proppant before the fracturing operation is completed. Considerable effort has, therefore, been spent trying to design fluids that will satisfactorily meet these rigorous conditions.

High permeability formations such as those having permeabilities in excess of 50 millidarcy and particularly in excess of 200 millidarcy, present special challenges, especially when the reservoir temperature is above 1300° F. In these situations, the amount of fluid lost to the formation can be very high, resulting in increased damage and decreased fracture length. Further, the difference in permeability between the formation and the fracture is less than that realized in less permeable formations. Improved fracture cleanup is therefore necessary in order to maximize well productivity.

A wide variety of fluids has been developed, but most of the fracturing fluids used today are aqueous based liquids which have been either gelled or foamed. These fluids have typically been engineered for use in low permeability formations and are generally not well suited for use in higher permeability formations.

Aqueous gels are usually prepared by blending a polymeric gelling agent with an aqueous medium. Most frequently, the polymeric gelling agent of choice is a solvatable polysaccharide. These solvatable polysaccharides form a known class of compounds which include a variety of natural gums as well as certain cellulosic derivatives which have been rendered hydratable by virtue of hydrophilic substituents chemically attached to the cellulose backbone. The solvatable polysaccharides therefore include galactomannan gums, glycomannan gums, cellulose derivatives, and the like. In some instances, the aqueous liquid thickened with polymers alone has sufficient viscosity to suspend the proppant during the course of the fracturing process and represents a satisfactory fracturing fluid. In other instances, principally in higher temperature applications, however, it is necessary to crosslink the polysaccharide in order to form a gel having sufficient strength and viscosity to retain the proppant in suspension throughout the pumping operation and placement in the subterranean formation. A variety of crosslinkers (e.g., borate ions, titanium, zirconium and other transition metals) has been developed to achieve this result within different pH ranges. (See, for example, U.S. Pat. No. 3,059,909, U.S. Pat No. 3,974,077, U.S. Pat No. 3,202,556, U.S. Pat. No. 3,301,723 and U.S. Pat. No. 3,888,312.)

A different class of thickeners is described in U.S. Pat. No. 4,432,881, and identified as a superior fracturing fluid in U.S. Pat. No. 4,541,935. The thickener composition comprises a water soluble or water dispersible interpolymer having pendant hydrophobic groups chemically bonded thereto. When mixed with a water soluble or water dispersible nonionic surfactant, and a soluble electrolyte, a viscosified fluid stable to high temperature and/or shear is obtained.

Viscoelastic surfactants are employed as viscosifiers in the context of gravel packing fluids. Such systems contain virtually no insoluble residue. Gravsholt in *Viscoelasticity in Highly Dilute Aqueous Solutions of Pure Cationic Detergents*, J. Colloid & Interface Sci. (57)3(1976), 575–77 indicates that certain quaternary ammonium salts impart viscoelastic properties to aqueous solutions. Gravsholt showed that cetyl trimethyl ammonium bromide would not impart viscoelastic properties to water but that cetyl trimethyl ammonium salicylate and certain other aromatic containing quaternary amines would. In U.S. Pat. No. 3,292,698, a mixture of cyclohexyl ammonium chloride and undecane-3-sodium sulfate was taught to induce viscoelastic properties to a formation flooding liquid containing less than about 3.5 percent by weight of sodium chloride. Higher levels of sodium chloride were said to destroy the viscoelastic properties of the fluid. UK Pat. No. 1,443,244, discloses a specific ethoxylated or propoxylated tertiary amine employed to thicken and aqueous solution of a strong mineral acid. U.S. Pat. No. 3,917,536 teaches that certain primary amines may be employed in subterranean formation acidizing solutions to retard the reaction of the acid on the formation. The amine may be more readily dispersed into the acid solution with the use of a dispersing agent such as a quaternary amine.

In particular, Canadian Pat. No. 1,185,779, discloses a high electrolyte-containing aqueous wellbore service fluid which has improved viscosity characteristics over a wide range of wellbore conditions, including improved ease of preparation at the wellside and better shear stability and consistent viscosity over a wide temperature range. These improved aqueous wellbore service fluids are acknowledged as being useful in well known wellbore services such as perforation, clean-up, long term shut-in, drilling, placement of gravel packs and the like.

U.S. Pat. No. 5,551,516 discloses a fracturing fluid that contains (a) an aqueous base fluid, (b) an inorganic water soluble salt, (c) a thickener selected from certain amines, amine salts or quaternary ammonium salts and (d) a stabilizing organic additive. However, there is no disclosure therein of how to make the thickening agents, and therefore, no disclosure relating to the importance of controlling reaction conditions or process parameters (such as, for example, the presence or absence of intermediates in the final product) employed during manufacture of the thickening agent.

SUMMARY

The present disclosure relates to novel surfactant compositions for fracturing fluids useful in high temperature, high permeability formations. The novel surfactant compositions described herein and the fracturing fluids formulated therewith consistently provide a low leakoff rate, adequate viscosity to effect fracture extension and proppant transport and little or no residue remaining upon completion of the fracturing operation.

The present surfactant compositions contain quaternary ammonium salts having a long chain aliphatic group of a prescribed chain length distribution. Specifically, the surfactant compositions contain one or more compounds of the general formula:

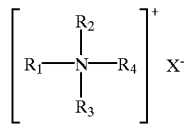

wherein $R_1$ is a long chain ($C_{10}$ to $C_{30}$) aliphatic group which may be branched or straight chained and which may be saturated or unsaturated, provided that about 3% or less of the $R_1$ groups in the surfactant composition have 18 or less carbon atoms, $R_2$, $R_3$ and $R_4$ can be the same or different and are each independently selected from the group consisting of $C_2$ to $C_6$ hydroxyalkyl groups, poly(oxyalkylene) groups and $C_1$ to $C_6$ aliphatic groups which can be branched or straight chained, saturated or unsaturated and which may be substituted with one or more groups that renders the $R_2$, $R_3$ or $R_4$ group more hydrophilic and the $R_2$, $R_3$ and $R_4$ groups may be formed into a heterocyclic 5- or 6-member ring structure which includes the nitrogen atom of the amine, and $X^-$ is a suitable anion. The surfactant compositions preferably contain about 1% or less of intermediate compounds that may be produced during synthesis of the quaternary ammonium compound.

In another aspect, methods of producing the surfactant compositions are described wherein during synthesis of the above-defined quaternary ammonium salt, intermediate compounds produced during synthesis of the teriary amine precursor of the quaternary ammonium salt are removed to a level of about 1% or less and the level of quaternary ammonium salt compounds containing long chain aliphatic groups having 18 carbon atoms or less is reduced to a level of about 3% or less.

Hydraulic fracturing fluids in accordance with this disclosure preferably contain: (a) an aqueous base fluid; (b) an effective amount of an inorganic water soluble salt to stabilize a subterranean formation by inhibiting hydration; (c) an effective amount of the surfactant composition as defined above, and (d) an effective amount of a stabilizing organic additive selected from the group consisting of an organic salt, a $C_4$ to $C_{12}$ aliphatic alcohol and mixtures thereof.

In yet another aspect, a process for fracturing a subterranean formation penetrated by a wellbore comprises providing an hydraulic fracturing fluid containing the novel surfactant composition described herein and injecting the hydraulic fracturing fluid through the wellbore and against the formation at a flow rate and pressure at least sufficient to initiate and/or extend a fracture into the formation.

DETAILED DESCRIPTION OF PREFERRED EMBODIMENTS

The present surfactant compositions are useful in preparing aqueous viscoelastic surfactant-based fracturing fluids. The surfactant compositions contain quaternary ammonium salts having a long chain aliphatic group of a prescribed chain length distribution. Specifically, the surfactant composition contain one or more compounds of the general formula:

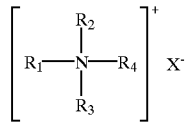

wherein $R_1$ is a long chain ($C_{10}$ to $C_{30}$) aliphatic group which may be branched or straight chained and which may be saturated or unsaturated, provided that about 3% or less, preferably 2% or less of the $R_1$ groups in the surfactant composition have 18 or less carbon atoms. $R_2$, $R_3$ and $R_4$ can be the same or different and are each independently selected from the group consisting of $C_2$ to $C_6$ hydroxyalkyl groups, poly(oxyalkylene) groups and $C_1$ to $C_6$ aliphatic groups which can be branched or straight chained, saturated or unsaturated and which may be substituted with one or more groups that renders the $R_2$, $R_3$ or $R_4$ group more hydrophilic. Two or more of the $R_2$, $R_3$ and $R_4$ groups may be formed into a heterocyclic 5- or 6-member ring structure which includes the nitrogen atom of the amine. Preferably, at least two of $R_2$, $R_3$ and $R_4$ are $-(CH_2-CHR_5-O)_nH$ wherein $R_5$ is hydrogen or a $C_1$ to $C_4$ alkyl and n is a number from 1 to 6. $X^-$ is a suitable anion such as a nitrate, acetate, oxalate, perchlorate or halide. A halide (Cl, Br or I) is preferred, Cl and Br being most preferred.

The surfactant composition preferably contains about 1% or less, preferably 0.8% or less of intermediate compounds that may be produced during synthesis of the tertiary amine precursor of the quaternary ammonium salts contained in the surfactant composition. Among the intermediate compounds that might be present in the surfactant composition are fatty alkyl nitriles, fatty alkyl unsubstituted amides, dialkyl fatty secondary amines, ethoxylated dialkyl fatty tertiary amines, olefins, fatty alkyl halides and fatty alkyl alkanols and hydrocarbon solvents and residues. The particular types of intermediate compounds present will depend on a number of factors including the raw materials and reaction scheme employed to produce the tertiary amine.

Suitable quaternary ammonium salts can be prepared by methods known to those skilled in the art provided that care is taken to remove intermediate compounds to the desired level and to reduce the level of compounds having 18 or less carbons in the long chain aliphatic group to 3% or less.

Thus, for example, a desired fatty acid or mixture of fatty acids can be converted into a nitrile using ammonia and methods known to those skilled in the art. The nitrile can then be reduced to a primary amine. Any unsaturation should be preserved while obtaining a primary amine with less than about 0.5% nitrile, preferably less than about 0.3% nitrile. The primary amine can then be distilled to produce a primary amine with less than 0.1% dialkyl secondary amine and less than 0.1% unsubstitute amide. This distillation can also be used to take a fractional cut of the primary amine to produce a distilled primary amine having the desired chain length distribution. The distilled primary amine can then be reacted with ethylene oxide to generate the tertiary amine which can be quaternized, such as, for example, with methyl chloride.

It should be understood that if the chain length distribution is tightly controlled, more than 1% of intermediate compounds can be tolerated. Thus, if the amount of $C_{18}$ or less compounds is kept below 1% of the surfactant composition, the presence of 1.5% or more of intermediate compounds will not significantly interfere with the performance of the fracturing fluid.

Advantageously, fracturing fluids made with the present surfactant compositions can consistently provide a viscosity greater than 90 centipoise at temperatures in the range of 140–150° F.

In addition to the surfactant composition, the aqueous fracturing fluid in accordance with this disclosure preferably contain a sufficient quantity of at least one water soluble inorganic salt to effect formation stability. Typically, water soluble potassium and ammonium salts, such as potassium chloride and ammonium chloride are employed. Additionally, calcium chloride, calcium bromide and zinc halide salts may also be used. Formation stability and in particular clay stability is achieved at a inorganic salt concentration level of a few percent by weight. If fluid density becomes an important consideration, heavier inorganic salts may be employed.

A water soluble organic salt and/or alcohol can also be employed in the fracturing fluid to effect, in combination with the surfactant composition, the desired viscoelastic properties. The organic salt constituent of the fracturing fluid is preferably a water soluble compound involving typically a sodium or potassium salt of an organic anion. The anion may be an aromatic organic anion such as a salicylate, naphthalene sulfonate, p- and m-chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6,-tetrachlorophenate, p-methyl phenate, m-chlorophenate, 3,5, 6-trichloropicolinate, 4-amino-3,5,6-trichloropicolinate, 2,4-dichlorophenoxyacetate, toluene sulfonate, $\alpha,\beta$-napthols, p,p' bisphenol A or cocoamidopropyl dimethyl amine oxide. Preferably the organic salt is a water soluble carboxylate salt such as sodium or potassium salicylate or the like. Suitable alcohols include $C_4$ to $C_{12}$ aliphatic alcohols.

The surfactant composition is employed in the fracturing fluid in an amount which in combination with the other ingredients is sufficient to increase the viscosity of the aqueous fluid enough to maintain proppant in suspension during fluid placement. The exact quantity and specific surfactant composition to be employed in formulating the fracturing fluid will vary depending on the concentration of and specific soluble salt(s) employed to make up the fluid, the viscosity desired, the temperature of use, the pH of the fluid, and other similar factors. The concentration of the surfactant composition can range from about 0.05 to about 6 percent by weight of the fluid. Simple laboratory procedures can be employed to determine the optimum concentrations for any particular set of parameters.

One preferred aqueous hydraulic fracturing fluid contains up to a few percent of an inorganic salt such as KCl or $NH_4Cl$ and a selected amount of an organic salt such as sodium salicylate. A preferred thickening agent for the above defined hydraulic fracturing fluid contains a quaternary ammonium salt, erucyl methyl bis (2-hydroxyethyl) ammonium chloride wherein the level of intermediate compounds and level of $C_{18}$ or less compounds are within the above-stated ranges.

To prepare the aqueous hydraulic fracturing fluid, the surfactant composition is added to an aqueous solution in which has been dissolved a quantity of at least one water soluble inorganic salt to provide formation stability and at least one water soluble organic salt to provide selective control of the loss of particle suspension properties. Standard mixing procedures known in the art can be employed since heating of the solution and special agitation conditions are normally not necessary. Of course, if used under conditions of extreme cold such as found in Alaska, normal heating procedures should be employed. It has been found in some instances preferable to dissolve the surfactant composition into a lower molecular weight alcohol prior to mixing it with the aqueous solution. The lower molecular weight alcohol, for instance isopropanol, functions as an aid to solubilize the surfactant composition. Other similar agents may also be employed. Further, a defoaming agent such as a polyglycol may be employed to prevent undesirable foaming during the preparation of the fracturing fluid if a foam is not desirable under the conditions of the treatment. If a foam or gas-energized fluid is desired, any gas such as air, nitrogen, carbon dioxide and the like may be added.

In addition to the water soluble salts and surfactant composition agents described hereinbefore, the aqueous hydraulic fracturing fluid may contain other conventional constituents which perform specific desired functions, e.g., corrosion inhibitors, fluid-loss additives, and the like. The proppant can then be suspended in the fracturing fluid.

The fluids described herein can be employed in standard fracturing treatments, employing techniques and equipment well known in the art. The following examples illustrate the preparation of the surfactant compositions and properties of aqueous viscoelastic surfactant-based hydraulic fracturing fluids made therefrom.

EXAMPLE 1

A reaction vessel was filled to 66% of capacity with erucic acid and with a catalyst ($Al_2O_3$). The system was heated and ammonia was sparged through the reactor after the temperature has reached >80° C. Heating was continued until the temperature reached 280° C. Water was removed via gas stripping and the reaction continued until the conversion to nitrile was complete. This nitrile was then vacuum distilled (200–500 mTorr) at 160–220° C. The distilled nitrile was then added to a reactor with a nickel hydrogenation catalyst. The reactor was heated to 135° C. and purged with ammonia. After purging was finished, the ammonia was charged to a head pressure of 400 psig. Hydrogen was then charged to a total pressure of 600 psig. The hydrogen pressure was maintained until the reduction of the nitrile was complete. The primary erucyl amine was then vacuum distilled (350–700 mTorr) at 180–210° C. The composition of the distallate is monitored using techniques known to those skilled in the art to collect the fraction having the desired chain length distribution and by-product content. The distilled primary amine was then added to a reactor which was heated to 100° C. and sparged with nitrogen. The reactor was then pressurized with nitrogen to 10 psig and heated to 180° C. The reactor was vented to a pressure of 10 psig and two mole equivalents of ethylene oxide was added sequentially so that the total pressure never exceeds 50 psig. The reaction exotherm was controlled so as to maintain a temperature of 180° C. The ethoxylated erucyl amine was then placed in a reactor with isopropanol and sodium bicarbonate (1% of ethoxylated amine). The reactor was then sealed and heated to 95° C. Methyl chloride was then added to achieve a head pressure of 90 psig. The reaction was continued until the quaternization was complete. The product was discharged and filtered. The resulting product (designated as Sample 1) was analyzed using techniques known to those skilled in the art (e.g., GC, LC) to determine the amount of intermediate compounds present and the amount of quaternary ammonium salt having a long chain aliphatic group containing 18 or less carbon atoms. The results are reported in Table I.

Additional samples containing varying amounts of intermediate products and varying chain length distributions were produced and analyzed in a similar manner to that described above. The characteristics of these additional samples are also described in Table I.

TABLE I

| Sample | % intermediate products | % C18 and less chains in distribution |
|---|---|---|
| Sample 1 | 0.30 | 2 |
| Sample A | 0.18 | 4 |
| Sample B | 0.87 | 9 |
| Sample 2 | 1.4 | >1 |
| Sample C | 0.31 | 10 |

EXAMPLE 2

A viscoelastic sample is produced by mixing 784 mL of a 3% aqueous $NH_4Cl$ (w/w) solution and 16 mL of the molten surfactant sample to be tested in a blender until completely dispersed. The mixture is heated to 70–74° C. and maintained at that temperature until sample is clear and not opaque. The hot (70–74° C.) solution is poured into a Fann viscometer up to fill line with the bob in the down position. The viscometer is turned on by setting the (revolutions per minute) switch to 100. The temperature (from probe) is recorded in degrees Fahrenheit and the viscosity number is recorded at 150, 140, 130, 120, 110° F. These numbers are multiplied by three to obtain viscosity in cps. The results are tabulated in Table II.

TABLE II

| | Viscosity (cps) at Temperature (°F.) | | | | |
|---|---|---|---|---|---|
| Sample | 110 | 120 | 130 | 140 | 150 |
| Sample 1 | 126 | 111 | 105 | 96 | 102 |
| Sample A | 123 | 105 | 96 | 84 | 87 |
| Sample B | 57 | 57 | 63 | 63 | 66 |
| Sample 2 | 111 | 105 | 90 | 90 | 90 |
| Sample C | 75 | 60 | 61 | 60 | 54 |

As the foregoing data show, fracturing fluids containing 3% or less (samples 1 and 4) provided a viscosity of at least 90 cps at temperatures in the range of 140–150° F. Additionally, this data shows that where chain length distribution is tightly controlled (sample 4) the presence of greater than 1% intermediate products does not have any significant adverse affect on the results.

While the invention has been described in the more limited aspects of preferred embodiments thereof, other embodiments have been suggested and still others will occur to those skilled in the upon a reading and understanding of the foregoing specification. It is intended that all such embodiments be included within the scope of this invention as limited only by the appended claims.

We claim:

1. A surfactant composition comprising: one or more quaternary ammonium compounds of the general formula:

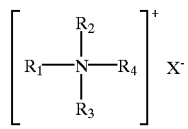

wherein $R_1$ is a $C_{10}$ to $C_{30}$ aliphatic group which may be branched or straight chained and which may be saturated or unsaturated, provided that about 3% or less of the $R_1$ groups in the surfactant composition have 18 or less carbon atoms; $R_2$, $R_3$ and $R_4$ can be the same or different and are each independently selected from the group consisting of $C_2$ to $C_6$ hydroxyalkyl groups, poly(oxyalkylene) groups and $C_1$ to $C_6$ aliphatic groups which can be branched or straight chained, saturated or unsaturated and which is optionally substituted with one or more groups that renders the $R_2$, $R_3$ or $R_4$ group more hydrophilic, the $R_2$, $R_3$ and $R_4$ groups can be formed into a heterocyclic 5- or 6-member ring structure which includes the nitrogen atom of the amine, and $X^-$ is an anion.

2. A composition as in claim 1 wherein the composition contains about 1% or less of intermediate compounds produced during synthesis of a tertiary amine precursor of the one or more quaternary ammonium compounds.

3. A composition as in claim 1 wherein at least one of $R_2$, $R_3$ and $R_4$ are groups of the formula —$(CH_2$—$CHR_5$—$O)_n$H wherein $R_5$ is hydrogen or a $C_1$ to $C_4$ alkyl and n is a number from 1 to 6.

4. A composition as in claim 1 wherein the amount of $R_1$ groups having 18 or less carbon atoms in the surfactant composition is about 2% or less.

5. A composition as in claim 2 wherein the amount of intermediate compounds in the composition is about 0.8% or less.

6. A method of preparing a surfactant composition comprising the steps of:
providing a reaction product containing a mixture of primary amines, at least a portion of the primary amines in the mixture containing 18 or more carbon atoms, the reaction product optionally containing intermediate reaction by-products;
purifying the reaction product by removing primary amine containing 18 or less carbon atoms from the reaction product to a level of about 3% or less;
forming a quaternary ammonium salt from the purified reaction product.

7. A method as in claim 6 wherein the steps of purifying the reaction product comprises distilling the reaction product.

8. A method as in claim 6 wherein the step of forming a quaternary ammonium salt comprises producing a tertiary amine from the primary amine in the purified reaction product and quaternizing the tertiary amine.

9. A method as in claim 8 wherein the step of producing a tertiary amine comprises reacting the purified reaction product with alkylene oxide.

10. A method as in claim 6 wherein the step of purifying the reaction product comprises removing intermediate reaction by-products from the reaction product to a level of about 1% or less.

11. A method as in claim 8 wherein further comprising the step of removing intermediate reaction by-product from the tertiary amine to a level of about 1% or less prior to quaternizing the tertiary amine.

12. A surfactant composition prepared by the method of claim 6.

13. The surfactant composition of claim 12 wherein the composition comprises one or more quaternary ammonium compounds of the general formula:

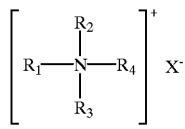

wherein $R_1$ is a $C_{10}$ to $C_{30}$ aliphatic group which may be branched or straight chained and which may be saturated or unsaturated, $R_2$, $R_3$ and $R_4$ can be the same or different and are each independently selected from the group consisting of $C_2$ to $C_6$ hydroxyalkyl groups, poly(oxyalkylene) groups and $C_1$ to $C_6$ aliphatic groups which can be branched or straight chained, saturated or unsaturated and which is optionally be substituted with one or more groups that renders the $R_2$, $R_3$ or $R_4$ group more hydrophilic, the $R_2$, $R_3$ and $R_4$ groups can be formed into a heterocyclic 5- or 6-member ring structure which includes the nitrogen atom of the amine, and $X^-$ is an anion.

14. A hydraulic fracturing fluid comprising the surfactant composition of claim 1.

15. A hydraulic fracturing fluid as in claim 14 further comprising:
an aqueous medium;
an amount of an inorganic water soluble salt sufficient to stabilize a subterranean formation by inhibiting hydration; and
an organic stabilizing additive selected from the group consisting of an organic salt, a $C_4$ to $C_{12}$ aliphatic alcohol and mixtures thereof.

16. A hydraulic fracturing fluid as in claim 14 which exhibits a viscosity of at least 90 centerpoise at temperatures in the range of 140 to 150° F.

17. A method of fracturing a subterranean formation comprising the steps of:
providing an aqueous viscoelastic surfactant based hydraulic fracturing fluid comprising:
an aqueous medium;
an amount of an inorganic water soluble salt sufficient to stabilize a subterranean formation by inhibiting hydration;
a surfactant composition in accordance with claim 1;
of an organic stabilizing additive selected from the group consisting of an organic salt, a $C_4$ to $C_{12}$ aliphatic alcohol and mixtures thereof, and
pumping the aqueous viscoelastic surfactant based fluid through a wellbore and into a subterranean formation at a pressure sufficient to fracture the formation.

18. The method of fracturing as set forth in claim 17 wherein the step of providing comprises providing an aqueous viscoelastic surfactant based fluid further including a particulate proppant suspended therein.

19. A method of fracturing a subterranean formation comprising the steps of:
providing an aqueous viscoelastic surfactant based hydraulic fracturing fluid comprising:
an aqueous medium;
an amount of an inorganic water soluble ammonium salt sufficient to stabilize a subterranean formation by inhibiting hydration;
a surfactant composition prepared in accordance with the method of claim 8; and
an organic stabilizing additive selected from the group consisting of an organic salt, a $C_4$ to $C_{12}$ aliphatic alcohol and mixtures thereof, and
pumping the aqueous viscoelastic surfactant based fluid through a wellbore and into a subterranean formation at a pressure sufficient to fracture the formation.

20. The method of fracturing as set forth in claim 19 wherein the step of providing comprises providing an aqueous viscoelastic surfactant based fluid further including a particulate proppant suspended therein.

* * * * *